United States Patent [19]

Carr et al.

[11] Patent Number: 5,025,265
[45] Date of Patent: Jun. 18, 1991

[54] METHOD AND APPARATUS FOR INCREASING VISIBILITY OF TREND LINES ON STRIP CHART RECORDERS

[75] Inventors: Daniel J. Carr, Harleysville; Charles R. Scally, Warminster, both of Pa.

[73] Assignee: General Signal Corporation, Stamford, Conn.

[21] Appl. No.: 288,322

[22] Filed: Dec. 21, 1988

[51] Int. Cl.$^5$ .............................................. G01D 9/00
[52] U.S. Cl. ..................................... 346/1.1; 346/136
[58] Field of Search ................. 346/1.1, 136, 17, 113, 346/114

[56] References Cited

U.S. PATENT DOCUMENTS 3,889,275  6/1975  Miller ................................... 346/136
4,496,250  1/1985  Walsh ............................. 346/33 TP Primary Examiner—Bruce A. Reynolds
Assistant Examiner—Huan Tran
Attorney, Agent, or Firm—William G. Miller, Jr.; Harold Huberfeld

[57] ABSTRACT

A multipoint recorder with a slow effective chart speed is operated to provide good visibility for the most recent record. A number of consecutive values for each point are scanned and stored. These values are recorded by a high speed printing mechanism during a first period of the recording cycle after which the chart is advanced forward for the remaining period of the recording cycle to a point which makes that record easily visible. At the end of the recording cycle the chart is retracted to start the next printing period with the printing mechanism at a point which corresponds to that required make the record look like a continuous line and to provide the desired time scale along the chart. To accomplish this the cycle time is coordinated to the chart speed and the number of consecutive scans recorded during each recording cycle.

9 Claims, 3 Drawing Sheets

METHOD AND APPARATUS FOR INCREASING VISIBILITY OF TREND LINES ON STRIP CHART RECORDERS

BACKGROUND OF THE INVENTION

This invention relates to multipoint strip chart recorders for recording trend lines for the values of the input signals representing a number of points and particularly to recorders designed for industrial use where slow chart speeds are desirable and where it is also desirable to be able to view with ease the most recent part of the record. Industrial strip chart recorders typically have a horizontally oriented paper drive roll which is motor driven so that chart paper is fed at a predetermined rate from a supply system, such as a paper supply roll or supply tray in the back of the recorder case, over the chart drive roll and down the front of the case, frequently over a vertical table, to a collection system, such as a take-up roll or a paper collection tray, depending on whether the chart is in the form of a roll or a fan-fold. In industrial applications the chart is frequently fed at a speed of 1 or 2 cm/hr with the intent that the position of any record on the chart should be indicative not only of the value of the variable being recorded but also of the time at which the variable was measured.

In single point recording the record is typically made by a pen which continuously draws a line on the chart indicating the trend of the variable. In such recorders the pen is frequently constructed so that it is recording the current value of the variable at a point on the front half of the drive roll so that the current value can be easily viewed from in front of the recorder. Such pen structures utilize a long curved end so that the mark made by the end of the pen is not obscured either by the scale of the recorder, typically just above the feed roller and toward the front, or by the pen carriage and its supporting track, usually just above the paper drive roll.

In multipoint recording when slow chart speeds are used the problem of getting good visibility of the most recent record is complicated by the size of the required printing mechanism. Generally these recorders are designed to make their record on the top portion of the paper drive roll, preferably at top-dead-center, in order to accommodate the large printing mechanism. That position, in combination with the presence of a scale above the chart, almost completely obscures the most recent record. Others have attempted to mount the printing mechanism forward of top-dead-center, but these arrangements have been found to be unsatisfactory because the printing mechanism, by itself, substantially obscures the recent record when it is mounted in a forward position.

In recorders using slow chart speeds, the problem of reading the most recent record is at its worst. In fact, that part of the record may not be visible to the operator until more than an hour after the record is made. Such a time delay is frequently found to be intolerable. Also, since recorders of this type are frequently arrayed in large numbers on adjacent vertical panels, they must not require that a great effort be expended in monitoring the recent values and their trend, for otherwise mistakes resulting from erroneous monitoring will be the likely result. In order for the user to not only be able to read the most recent record but also to have confidence in the accuracy of his efforts he should be able to see some blank chart above the most recent recorded values.

It is an object of this invention to provide a method and apparatus for effecting a multipoint record on a strip chart recorder while at the same time providing good visibility for the most recent portion of that record.

SUMMARY OF THE INVENTION

In order to provide good visibility for the most recent record on a multipoint strip chart recorder the printing mechanism of the recorder is operated to print only during an initial printing period of consecutive recording cycles. At the end of the initial period of the cycle, during the final period, the paper drive roll which feeds the chart paper is advanced forward to a rest position so as to make the record which was laid down during the previous printing period visible from a normal viewing position. This forward rest position is maintained until the beginning of the next recording cycle, at which time the feed roll is reversed to retract the chart to begin a new cycle. This retraction is to a position forward of the position occupied during the printing period of the previous recording cycle by an amount corresponding to that required to maintain a selected time scale for the chart so that the positions of the recorded values along the length of the chart are always indicative of the time the corresponding value was scanned. Each recording cycle may record values from a number of scans of the points being recorded in order that the printing mechanism may lay down in a single traverse a record for a number of consecutive values for each point being recorded, thereby increasing the time available for the rest period in each recording cycle and hence increasing the ease of reading the record. The retraction of the chart at the end of each cycle may advantageously be of amount such that the record printed in each cycle will be contiguous with that printed during the previous cycle so that the record looks like a continuous line denoting the trend of the value for each point.

BRIEF DESCRIPTION OF THE DRAWINGS

In the drawings, where like reference characters indicate like elements.

DESCRIPTION OF THE PREFERRED EMBODIMENTS

Figures 1, 1A:
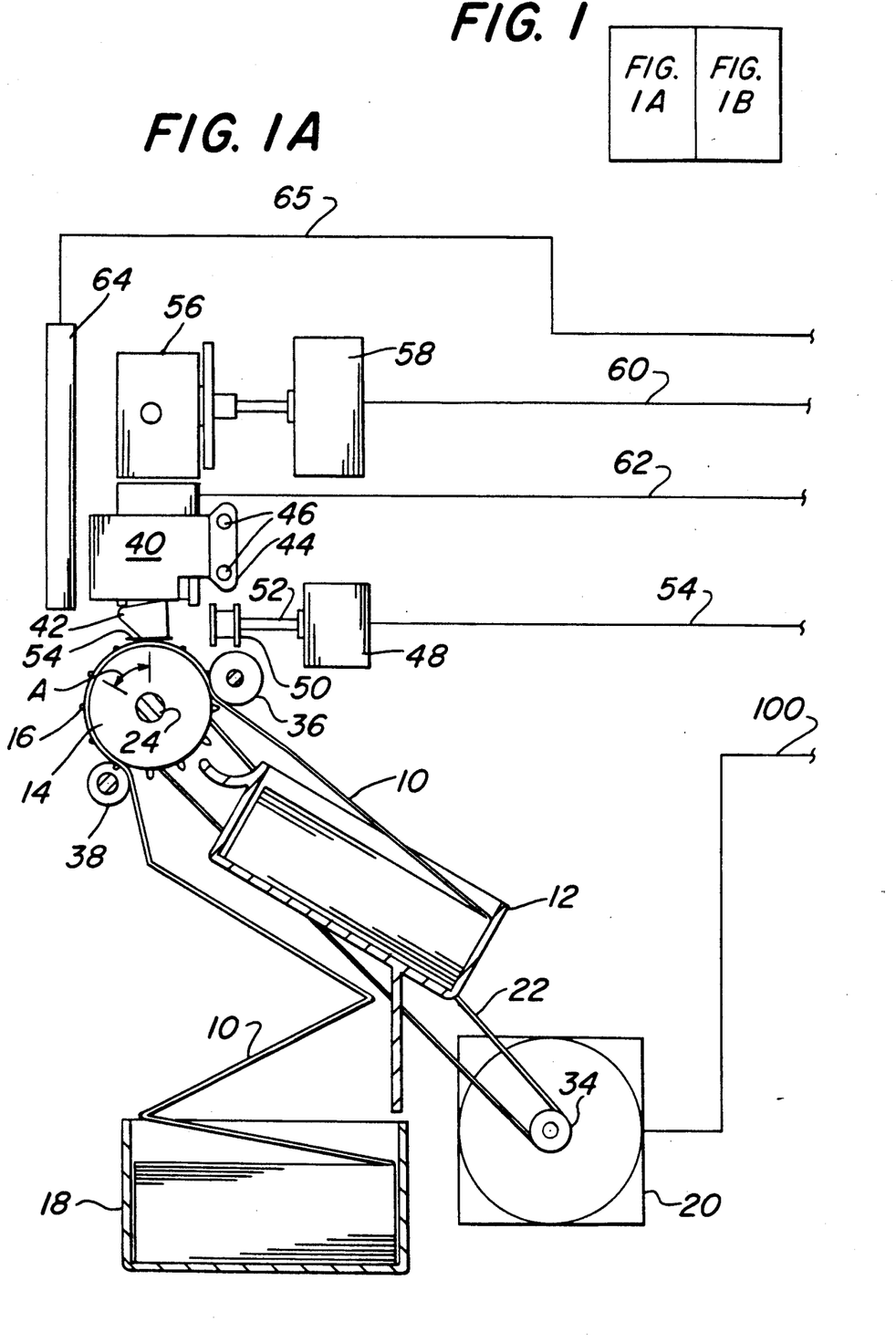
FIG. 1 shows the manner in which FIGS. 1A and 1B can be juxtaposed in order to provide an example of a strip chart recorder to which the invention can be applied.
FIG. 1A is a side view, partially in cross section, of a recorder which can be used in carrying out the invention.

In FIG. 1A, a recorder is shown having fanfold chart paper 10, of the type which has sprocket holes in its edges to accommodate driving sprockets. The chart 10 is shown being fed from a supply tray 12, located toward the back of the recorder, over a cylindrical paper drive roll 14, located near the top front of the recorder. The drive roll is shown as having drive sprockets, such as 16, located around its periphery at each of its ends for engaging the sprocket holes. The chart is fed from the drive roll into a collection tray 18, located below the drive roll, as the drive roll is driven by the chart drive motor 20. This motor is preferably a stepping motor so that the chart is driven in discrete steps in order that it may be accurately positioned at certain times in the recording process in order to locate each individual recorded point along the length of the chart at a position indicative of the time when that point was sampled. The stepper motor drives the chart through a belt 22 which is desirably a reinforced rubber timing-tooth belt that has zero backlash in both directions in order to provide a precise positioning of the drive roll. As shown, the shaft 24 of the drive roll is fixedly mounted in a frame 30 with the roll being supported by the shaft at each end through the bearings 26 and 28 (FIG. 2) so that the roll may rotate on the shaft. On one side of the drive roll, a timing belt pulley 32 is fitted to the drive roll for driving by the belt 22. The other end of the drive belt is engaged by the timing belt drive pulley 34. Both the driven pulley 32 and the drive pulley 34 have teeth spaced to match the teeth of the timing belt 22 so that the desired positive positioning of the paper drive roll can be accomplished in steps of suitable size.

It is important that the bearings 26 and 28 be high quality bearings of a type which will allow essentially no play of the drive roll on the shaft 24. It is also important that the chart paper should be firmly maintained in contact with the chart drive roll 14 and its sprockets 16 so that there will be no backlash in the drive of the chart in either a forward or backward direction. To maintain a constant driving relationship between the chart paper and the sprockets, the rollers 36 and 38 are provided. The roller 36 is a V-grooved roller in that its periphery has a V-groove for receiving the drive sprockets, such as 16, in order that the edges of the roller 36 will maintain the paper in sprocket engagement.

In the recorder of FIG. 1A, the record is impressed on the chart 10 by a printing mechanism 40 which consists of an impact type print head 42 and a carriage 44 for supporting the print head and carrying it across the chart on a pair of horizontal rails 46 to allow the print head to traverse the full width of the chart 10 in response to the stepping of the carriage positioning motor 48. The motor 48 is coupled to the carriage of the printing mechanism by a tensioned drive cable, not shown. This drive is accomplished through a capstan 50 mounted on the shaft 52 of the carriage positioning motor.

The print head is of the type utilized in dot matrix printers in that it uses a series of wires which are selectively fired in response to an electrical signal to cause the wires to impact on the printer ribbon 54 to thereby impress a dot on the chart beneath the printer ribbon. By way of example, the wires in the print head may be spaced along a line which runs along the length of the chart and is therefore along the time axis of the chart. This spacing can be such that the wires are 1/72 inch apart, which corresponds to one point of type. Also, the carriage positioning motor may advantageously be a stepping motor arranged to selectively position the carriage 44 across the chart in steps of 1/72 inch in response to electrical carriage drive signals received from line 54. As shown in FIG. 1A, the wires contained in the print head are fired selectively by print drive signals received from line 62.

As is required in most printing mechanisms, the ribbon must be frequently moved under the print head so that there will be a fresh ribbon to provide a clear impression on the chart for each point. The ribbon cartridge 56 contains a supply of ribbon which is recirculated over the chart by the rotation of ribbon motor 58 in response to signals received from line 60.

The top front portion of the recorder contains a dot matrix graphic display 64 which receives its input from line 65. That input is such that the display can provide a scale with a pointer to indicate the value of certain inputs, which may or may not be recorded. The display spans the entire width of the chart to provide a visual indication of the values of certain points and to provide a calibration for interpreting the chart record from a distance.

Figure 1B:
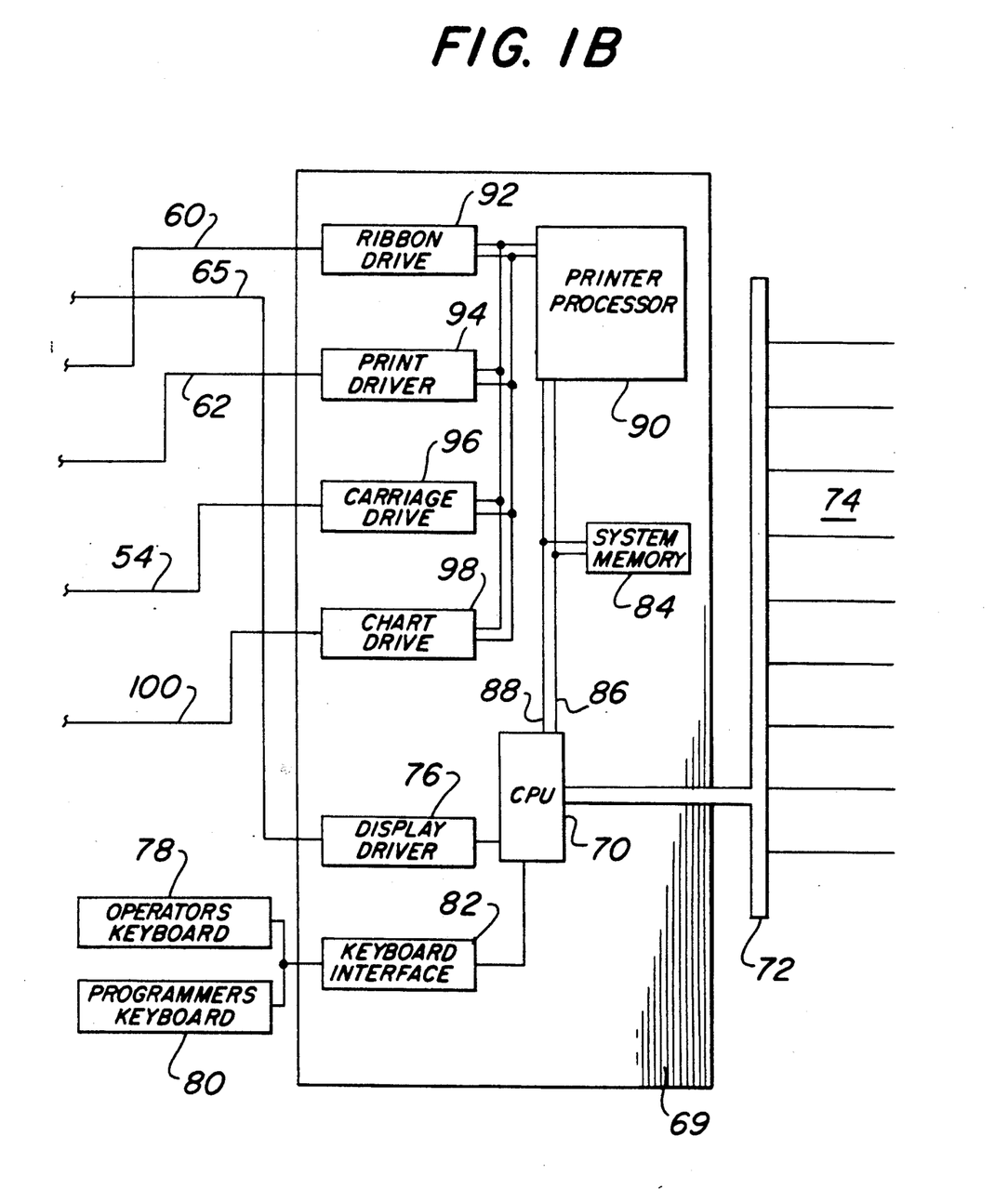
FIG. 1B is a block diagram of a circuit for the recorder of FIG. 1A which can be used to carry out the invention.

FIG. 1B shows a block diagram of the electrical circuits of the recorder of FIG. 1A. Those circuits include a digital computer circuit 69 for operating the recorder and means for providing inputs to the recorder. The heart of the digital computer circuit is, of course, the central processing unit (CPU) 70, which can be a 32016, 16 bit processor. This processor handles the measuring of the inputs which are obtained from the input bus 72 which, in turn, derives its input from the various primary measuring elements associated with the inputs to the input cards 74. Each input card may be designed to receive on its input terminals the signals representing a number of the points to be recorded. These signals may typically be voltages, as from thermocouples, the resistance of a resistance thermometer, pulse input signals, etc.

The central processor also is coupled to the display drive circuit 76 which provides on line 65 the signals to drive the display 64.

An operators keyboard 78 and a programmers keyboard 80 are also connected to the CPU by way of the keyboard interface circuits, shown as block 82, in order to provide manual input to the computer.

The processing which is carried out by the CPU is done in conjunction with the system memory 84 which is coupled to the CPU by the address bus 86 and the system data bus 88. Also coupled to the CPU is another processor 90 which is the printer processor and serves to operate a ribbon driver 92 to control ribbon advance, a print driver 94 to control the firing of the print wires, a carriage driver 96 to control carriage position, and a chart driver 98 to control chart positioning, both forward and backward, in response to signal supplied on line 100.

In order to provide good visibility for the most recent record on a multipoint recorder when a slow chart speed is to be used, it is important that a fast printing mechanism be used. To that end, mechanisms such as those used in dot matrix printers are useful. With such a mechanism a large number of points can be recorded in a very short time. For example, a four color recording of up to 30 points can be accomplished in less than 5 seconds with four traverses of the chart by the print head. Of course, recording in a single color would require only one traverse and hence could be done in much less time.

When using a fast printing mechanism, and particularly one which is capable of recording a number of consecutive values for each point in a single traverse of the chart, as would be the case with a dot matrix type printhead, it is possible to further maximize the time between the periods when the printing must be done.

By way of example, it would be possible to record in 5 seconds 8 values for each of the points whose inputs have been scanned in a single 39 second recording cycle, thus reserving the remaining 34 seconds of the recording cycle for a positioning of the chart in a rest position which is advanced from the printing position, so that the most recent recorded values can be easily seen. With such a cycle an effective chart speed of 26 cm/hr would provide a spacing of 1/72 in. between the centers of each of the 8 dots recorded in the printing period of the recording cycle to indicate the values scanned in the previous recording cycle. With that arrangement the feed drive roll, and hence the chart, is in the forward, rest position 87% of the time, and the most recent record can be easily viewed.

With a print head having a pitch of 1/72 in. (0.01389 in.), it would be advantageous for the chart drive motor 20 to be able to step the feed roll in corresponding steps of 0.01389 in. If we use a feed roll of 1.5038 in. diameter, the circumference of the drive roll will be 4.724 in. If we then use a chart drive motor which steps 200 steps per revolution (1.8 degrees) and we want 340 steps of the chart drive roll per revolution to obtain the 0.01389 in. per step, so that the steps matched the print head pitch, we must use a gear ratio of 1.7/1, that is 340 steps of the drive roll per 200 steps of the motor.

It has been found that it is desirable to have approximately a 60 degree angle of forward advance for the chart drive roll from a printing position at top-dead-center to the rest position, as shown in FIG. 1A for angle A, in order to have blank chart showing at the top of the chart as is necessary for good visibility of the most recent record. Using the 340 steps per revolution of the chart drive roll, 56 steps will give a forward angle of 59.29 degrees. It would then be necessary to drive the chart drive roll in reverse, backwards, for 48 steps after the rest period in order to prepare for the next printing period if the above mentioned chart speed and recording cycle are used. In general, therefore, the chart is reversed by the number of steps it was advanced less the number of wires which were fired.

If a very slow chart speed of 1 cm/hr is used, only a smaller number of input scans can be recorded in each cycle in order to keep the period of each cycle sufficiently short so that there will not be too long a period between the consecutive scans of the inputs. Thus, one could use a recording cycle of 127 seconds for a 1 cm/hr chart speed while firing only a single print wire for each point during each printing period in order to obtain the desired spacing between the consecutive dots printed for each point, namely 0.01389 in. The number of wires fired for each point in the printing period as well as the duration of the recording cycle is dependent on chart speed. Since it is desirable that the consecutive dots printed should touch in order to give the viewer the impression that the record is a continuous line, it is helpful if the diameter of the print wires is essentially equal to the pitch of the print head, 0.01389 in, for example. This type of record will make it less likely that adjacent records will be confused, and it will make the reading of the trend of the record easier to discern.

It will be evident that as chart speed is increased the recording cycle becomes shorter and shorter and hence with a fixed printing period the rest period becomes shorter and shorter. At some point, as the rest period becomes shorter, the use of the method of the invention does not provide sufficient improvement in the visibility of the record to warrant its use. We have found that rest periods shorter than 20 seconds prove not to be advantageous. Thus, it is desirable to disable the advancing of the chart after printing when such short rest periods occur.

Figure 2:
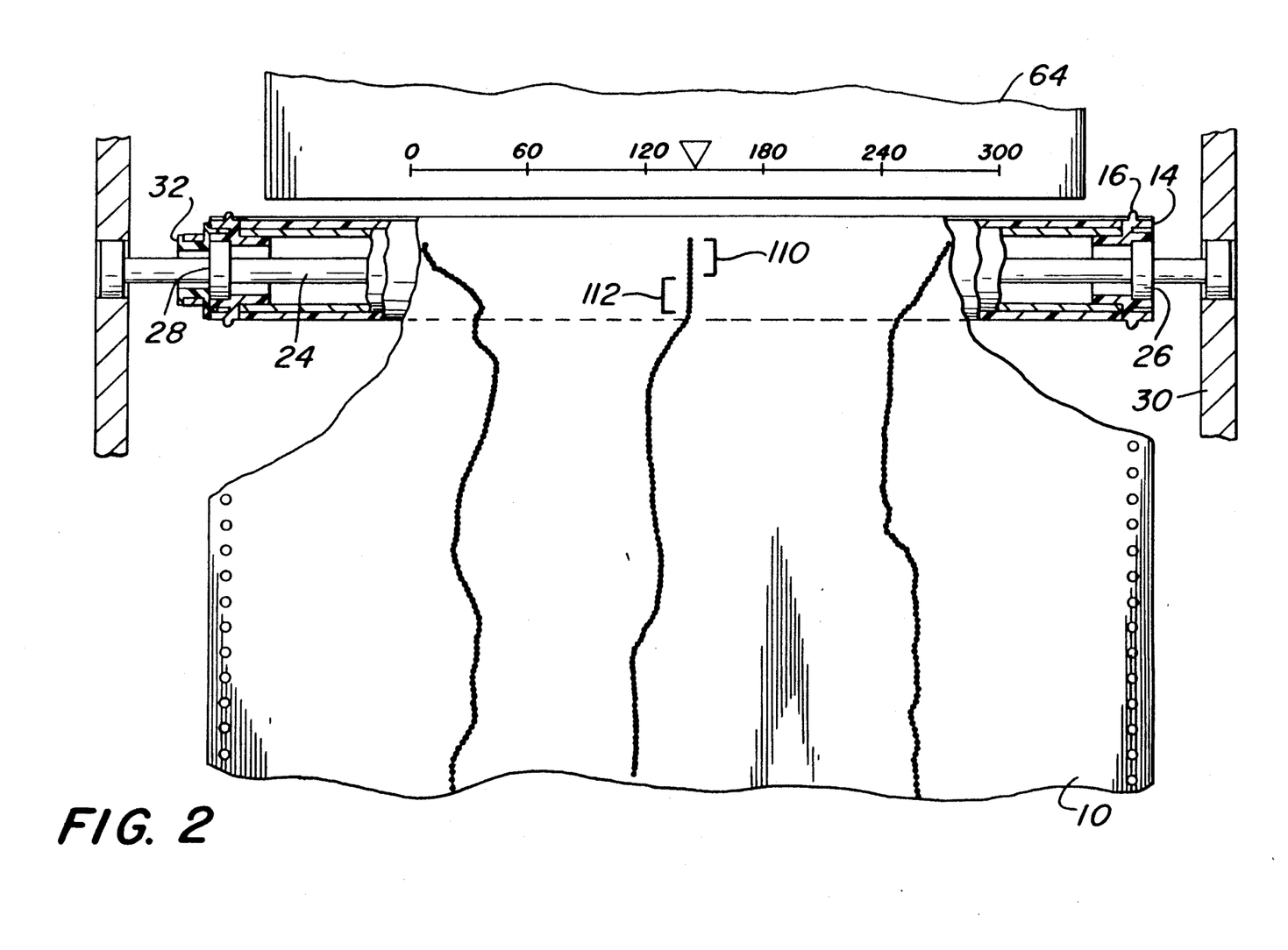
FIG. 2 is a front elevation of a portion of the recorder of FIG. 1A showing, by way of example, the type of chart which can be generated by such a recorder.

In FIG. 2, the chart 10 is shown in the advanced position it would occupy during the rest period of the recording cycle. Thus, the chart has been advanced by approximately 60 degrees since the most recent recording. If, for example, 8 consecutive scans of the inputs are recorded in each recording cycle, the 8 recorded dots laid down for a single input variable as spanned by bracket 110 show how the most recent record would look to the operator viewing the record from the front of the recorder. The bracket 112 spans the 8 dots laid down in the recording cycle just previous to the present cycle when the dots 110 were laid down. It will be noted that the dots on the ends of the record laid down in consecutive cycles are contiguous so that the record will appear to be a solid line from the normal viewing distance.

The following are program segments which will provide the desired operation of the invention. Some are in assembly language and the others are in "C". In these programs the word "TRENDVU" is the trademark identifying the method of the present invention.

```
;=================================================================
;
;                         ===TREND===
;
;       ADVANCE THE PAPER FOR TRENDVU
;
;=================================================================
;
TREND:   PUSH AF              ;SAVE THE REGISTER
         PUSH BC
         LD A,(MODE)          ;ACK THE MODE
         LD (MODACK),A
         CALL UNVIEW          ;IF TRENDVU ESTABLISHED UN-TRENDVU
```

```
        CALL PRIRUN         ;PRINT THE DATA
        CALL TRENVU         ;ESTABLISH TRENDVU
        SUB A               ;TELL MASTER WE ARE LEAVING
        LE (MODE),A
        CALL STAREP
        POP BC              ;RECOVER THE REGISTERS
        POP AF
        RET                 ;EXIT

;======================================================================
;
;                       ===TRENDVU===
;
;       ADVANCE PAPER FOR TRENDVU
;
;======================================================================
;
;TRENVU: PUSH AF            ;SAFE THE REGISTERS
        PUSH BC

LD A,005H           ;SET UP FOR DOWN DIRECTION
        LD (PAPSTD),A

TRNVU:  LD BC,(TRNSIZ)      ;SET UP THE DISTANCE
        LD (PAPSTA),BC
        LD (OLDVUE),BC      ;AND REMEMBER IT
        CALL PAPSTP         ;MOVE THE PAGE BACK UP
        POP BC
        POP AF
        RET
;
;======================================================================
;
;                       ===UNVIEW===
;
;       MOVE BACK FROM TRENDVU
;
;======================================================================
;
UNVIEW: PUSH AF             ;SAVE THE REGISTERS
        PUSH BC
        PUSH DE
        PUSH HL

;GET DISTANCE TO UNVIEW

LD HL,(OLDVUE)  ;LAST TREND VIEW SIZE
        SUB A           ;IF LAST VIEW WAS NOT TRENDVU,
        CP H            ;EXIT THIS ROUTINE
```

```
            JR NZ,UN     ;ELSE GO GET THE SIZE OF THE PAPER ADDV.
            CP L
            JR NZ,UN

LD A,(MODE)  ;SEE IF WE ARE IN TEXT MODE
            CP 0D5H      ;EXIT IF IN TEXT MODE
            JR Z,UNEXIT  ;ANY OTHER NODE PRESS ON

LE A,005H    ;SET UP TO STEP DOWN

LD (PAPSTD),A

UN2:        LD HL,PAPSTE ;SHOW HOW FAR
            LD DE,PAPSTA
            LDI
            LDI
            JR UNEX      ;NOW STEP PAPER AND EXIT

UN:         LD DE,(PAPSTE) ;THE SIZE OF PAPER ADVANCE
            SCF          ;ENSURE THE FLAG IS SET
            CCF          ;NOW SET IT LOW

;FIND OUT WHO IS BIGGER
            SBC HL,DE    ;PAPSTA=OLDVUE-PAPSTE
            LD A,OFAH    ;SET UP FOR UP DIRECTION
            LD (PAPSTD),A
            JR NC,UN1    ;IF RESULT IS POSITIVE,
                         ;GO RUN THE ROUTINE.
            SCF          ;ENSURE THE FLAG IS SET
            CCR          ;CLEAR THE CARRY FLAG
            LD HL,(OLDVUE) ;<DE> IS BIFFER SO RECOVER OLDVUE
            EX DE,HL     ;SWAP THEM
            SBC HL,DE    ;NOW SUBTRACT AGAIN
            LD A,05H     ;SET UP FOR DOWN DIRECTION
            LD (PAPSTD),A

UN1:        LD (PAPSTA),HL

UNEX:       CALL PAPSTP  ;MOVE THE PAGE BACK UP
            LD DE,(TRNSIZ) ;SAVE THE PROPER TREND SIZE
            LD (OLDVUE),DE

UNEXIT:     POP HL       ;RECOVER THE REGISTERS
            PAP DE
            POP BC
            POP AF
            RET
```

```
#include "std.h"
#include "prntr def.h"
/****************************************************************
**** DESCRIPTION :  This function sets the 64180 printer mode options.
****
****
**** INPUT : (UBYTE) Print Mode
****                $CA TREND_MODE_64180
****                $D5 TEXT_MODE_64180
****                $EA Calibration mode 64180
****                $f5 Diagnostic mode 64180
****
****         (USHORT) Paper Advance (Trend mode only)
****                  Number of vertical paper advances before 4 buffers
****                  printed.
****
****         (USHORT) Trendvu Size   (Trend mode only)
****                  Number of vertical paper advances for trendvu
****
**** OUTPUT : none
****
****
**** PROCESS:
****                Update print mode
****
****                If trend mode set
****                   Update paper advance
****                   Update trendvu size
****                Endif
*****************************************************************
*/ set_printer-mode_options(print_mode,paper_advance,trendvu_size)
  UBYTE print_mode;
  USHORT paper_advance;
  USHORT trendvu_size;
 {
  EXTERN USHORT printer_paper_step;
  EXTERN USHORT printer_trendvu_size;
  EXTERN UBYTE  printer_mode;

printer_mode = print_mode;
  if (print_mode == TREND_MODE_64180)
    {
     printer_paper_step =paper_advance;
     printer_trendvu_size = trendvu_size;
    }

}/* end function */
```

```
#include "std.h"
#include "stdtype.h"
#include "rec_def.h"
#include "chart_def.h"
#include "lpu_def.h"
#include "ptdata.h"
#include "pp_def.h"

/************************************************************************
**** DESCRIPTION :  This function is the overall trend executive.
****
**** INPUT :   None.
****
**** OUTPUT:  None.
************************************************************************
*/
VOID trend_exec()
   {
  EXTERN UBYTE trend_data_manager();
  EXTERN VOID  init_data_collection();
  EXTERN VOID  store_dot_data();
  EXTERN TREND trend;

EXTERN ULONG system_status;

UBYTE first_time_flag;
           UBYTE number_of_wires;

if( system_status & (FIRST_PWR_UP | COLD_STATR | WARM_START) )
     {
     init_data_collection(1);
     first_time_flag = 1;
     }
  else
     first_time_flag = 0;

if( number_of_wires = trend_data_manager(first_time_flag) )
     {
     clr_prtr_bfrs();

if( trend.lo_speed <= 50 )
        set_printer_mode_options( TREND_MODE_64180, (USHORT)number_of_wires, 56 );
     else
        set_printer_mode_options( TREND_MODE_64180, (USHORT)number_of_wires, 0 );

store_dot_data();

print_driver();
     }
}
```

What is claimed is:

1. A method for providing good visibility for the most recent record on a multipoint strip chart recorder of the type which periodically scans a plurality of input signals for which values are to be recorded and causes a printing mechanism to record those values as it traverses a strip chart arranged to be fed over a paper drive roll from a paper supply system to a paper collection system so that the lengthwise dimension of the chart represents time, comprising the steps of:

operating said printing mechanism during an initial printing period of consecutive recording cycles so it traverse the chart to record on the chart the values of the inputs which have been scanned since the previous recording cycle;

advancing the chart forward to a rest position for a subsequent period of the recording cycle by an amount sufficient to make the record laid down during said initial printing period more easily visible from a normal viewing position during the subsequent period of the cycle; and retracting said chart at the end of the recording cycle by driving the chart in reverse to a position forward of its position during said initial printing period of the recording cycle by an amount corresponding to that required to maintain the desired time scale along the length of the chart.

2. The method of claim 1 in which
said printing mechanism operates to record the values for a plurality of scans of the input signals in each printing period.

3. The method of claim 1 in which
the duration of the recording cycle, the number of scans per cycle, the time scale of the chart, and the amount the chart is retracted are coordinated with the size of the record impression made to represent each value being recorded so that those impressions are substantially contiguous throughout consecutive recording cycles.

4. The method of claim 3 in which
the printing mechanism is a multiwire impact type mechanism driven to traverse said chart by a stepping motor,
the chart is positioned lengthwise under the recording mechanism by a stepping motor, and
the amount of chart advance made during a single step and the amount of traverse made by the printing mechanism during a single step correspond substantially to the diameter of the wires of said printing mechanism.

5. A method for providing good visibility for the most recent record on a multipoint strip chart recorder of the type which periodically scans measured variables to be recorded and causes a printing mechanism to record the values of those variables as it traverses a chart being fed over a paper drive roll from a paper supply system to a paper collection system in a manner such that the lengthwise dimension of the chart represents time, comprising the steps of:

operating said printing mechanism so it traverses the chart on the top portion of the feed drive roll to record on the chart the values of measured variables which have been scanned since the previous printing of the values, said printing being such that the position of the record along the chart width is indicative of the value of the variable being recorded;

dividing the operating time of the recorder into cycles of duration depending on the time scale desired along the length of the chart so that each cycle has a fixed printing period sufficient for operation of the printing mechanism to print a record of the variables and a rest period of duration sufficient for viewing of the record;

advancing the feed drive roll at the end of each printing period to advance the chart to a rest position which is forward of the printing position, the advance of the drive roll being by an angle sufficient to make the most recent record on the chart more easily visible from a normal viewing position; and retracting said chart from said rest position at the end of said rest period by driving the feed roll in reverse to a position which is forward of the previous printing position on the chart by an amount corresponding to that required to maintain the selected time scale for the chart so that the position of a record along the length of the chart is always indicative of the time the corresponding variable was scanned.

6. A method for providing good visibility for the most recent record on a multipoint strip chart recorder of the type which periodically scans a plurality of input signals for which values are to be recorded and causes a printing mechanism to record those values as it traverses a strip chart arranged to be fed over a paper drive roll from a paper supply system to a paper collection system in a manner which will maintain a selected time scale along the length of the chart, comprising the steps of:

operating said printing mechanism during initial printing periods of consecutive recording cycles so it traverses the chart on the feed drive roll to record on the chart the values of the inputs which have been scanned since the previous recording cycle;

advancing forward the feed drive roll at the end of said initial period of the recording cycle by an angle sufficient to make the record laid down during said printing period visible from a normal viewing position during this final period of the cycle; and retracting said chart at the end of said final period of the recording cycle by driving the feed roll in reverse to a position forward of its position during the initial period of the recording cycle by an angle corresponding to that required to maintain the selected time scale.

7. The method of claim 6 in which
the angle of advance of said feed drive roll is approximately sixty degrees.

8. In a multipoint strip chart recorder of the type which periodically scans a plurality of input signals for which values are to be recorded and causes a printing mechanism to record those values as it traverses a strip chart arranged to be fed over a paper drive roll from a paper supply system to a paper collection system so that the lengthwise dimension of the chart represents time, the improvement comprising:

means for operating said printing mechanism during initial printing period of consecutive recording cycles so it traverse the chart to record on the chart the values of the inputs which have been scanned since the previous recording cycle;

means for advancing the chart forward to a rest position for a subsequent period of the recording cycle by an amount sufficient to make the record laid down during said initial printing period more easily visible from a normal viewing position during the subsequent period of the cycle; and means for retracting said chart at the end of the recording cycle by driving the chart in reverse to a position forward of its position during the previous printing period by an amount corresponding to that required to maintain the desired time scale along the length of the chart.

9. A multipoint strip chart recorder comprising:

a feed drive roll arranged in driving engagement of a portion of said chart to selectively position that portion between a chart supply system and a chart collection system;

a stepping motor in driving engagement with said feed drive roll;

a multiwire impact printing mechanism;

a stepping motor in driving relation to said printing mechanism for driving said mechanism stepwise to traverse that portion of chart engaged by said drive roll;

means for selectively driving the wires of said printing mechanism during the traverse of said chart by said printing mechanism so as to impress by impact on said chart impressions whose positions along the width of the chart are indicative of the individual values for the most recently scanned of the inputs to the recorder;

means for periodically driving the printing mechanism stepping motor to move said printing mechanism in traverse of said chart during an initial period of consecutive recording cycles;

means for selectively driving said wires so as to produce the record for said inputs during said traverses of said chart by the printing mechanism;

means operable to step the chart drive motor.

means for selectively energizing said chart drive motor;

said last named means being operable to step said chart forward to a position for easy viewing of the most recent record at the end of said initial period of said cycle and to step said chart backward at the end of the recording cycle to a position which will maintain a predetermined time scale for the chart.

* * * * *